US009225159B2

(12) United States Patent
Vangool et al.

(10) Patent No.: US 9,225,159 B2
(45) Date of Patent: Dec. 29, 2015

(54) THREE-PHASE GROUND FAULT CIRCUIT INTERRUPTER

(71) Applicants: Michael P. Vangool, Chicago, IL (US); Nehad El-Sherif El-Kharbawe, Chicago, IL (US); George J. Fenty, Chicago, IL (US)

(72) Inventors: Michael P. Vangool, Chicago, IL (US); Nehad El-Sherif El-Kharbawe, Chicago, IL (US); George J. Fenty, Chicago, IL (US)

(73) Assignee: LITTELFUSE, Inc., Chicago, IL (US)

( * ) Notice: Subject to any disclaimer, the term of this patent is extended or adjusted under 35 U.S.C. 154(b) by 98 days.

(21) Appl. No.: 14/133,839

(22) Filed: Dec. 19, 2013

(65) Prior Publication Data
US 2014/0168830 A1    Jun. 19, 2014

Related U.S. Application Data

(60) Provisional application No. 61/739,182, filed on Dec. 19, 2012.

(51) Int. Cl.
| | |
|---|---|
| *H02H 3/00* | (2006.01) |
| *H02H 9/08* | (2006.01) |
| *H02H 3/16* | (2006.01) |
| *H01H 83/04* | (2006.01) |
| *H02H 3/33* | (2006.01) |
| *H02H 7/00* | (2006.01) |
| *H02H 9/00* | (2006.01) |

(52) U.S. Cl.
CPC ............... *H02H 3/165* (2013.01); *H01H 83/04* (2013.01); *H02H 3/338* (2013.01); *H02H 9/005* (2013.01)

(58) Field of Classification Search
CPC ..................................................... H02H 3/165
USPC ............................................................ 361/42
See application file for complete search history.

(56) References Cited

U.S. PATENT DOCUMENTS

| 3,832,605 | A | * | 8/1974 | Clark, Jr. ....................... 174/481 |
| 4,870,532 | A | * | 9/1989 | Beatty et al. .................. 361/93.7 |
| 5,148,344 | A | * | 9/1992 | Rao et al. .......................... 361/42 |
| 5,321,575 | A | * | 6/1994 | Shilo ................................ 361/56 |
| 5,914,849 | A | * | 6/1999 | Perreira ......................... 361/187 |
| 6,278,266 | B1 | * | 8/2001 | Glasband ....................... 323/355 |
| 7,295,410 | B1 | | 11/2007 | Packard et al. |
| 2009/0212826 | A1 | * | 8/2009 | Mizunaga ........................ 327/62 |
| 2011/0216452 | A1 | * | 9/2011 | Haines et al. ................... 361/42 |

FOREIGN PATENT DOCUMENTS

| JP | 01105598 H | 4/1989 |
| WO | 2006130722 A2 | 12/2006 |
| WO | 2011112510 A2 | 9/2011 |

OTHER PUBLICATIONS

Extended European Search Report dated May 9, 2014 issued in corresponding European application No. 13198626.7 (8 pages).

* cited by examiner

*Primary Examiner* — Thienvu Tran
*Assistant Examiner* — Lucy Thomas
(74) *Attorney, Agent, or Firm* — Kacvinsky Daisak Bluni PLLC (57) ABSTRACT

A three-phase GFCI device is disclosed. The three-phase GFCI device may include contactors, a contactor control module configured to cause the contactors to close during normal operation of the GFCI device and open based on receiving a fault signal, a current detection module, a transient suppression module, a miswire detection module, a ground-fault test module, a ground load detection module, and a fail-safe module. In some examples, the GFCI device may include the stated modules in accordance with the UL 943C standard.

18 Claims, 7 Drawing Sheets

FIG. 12

THREE-PHASE GROUND FAULT CIRCUIT INTERRUPTER

RELATED APPLICATIONS

This application claims the benefit of U.S. Provisional Patent Application Ser. No. 61/739,182 filed Dec. 19, 2012, entitled "Three-Phase GFCI," which application is incorporated herein by reference in its entirety.

FIELD OF THE DISCLOSURE

The disclosure relates generally to the field of circuit protection devices, and more particularly to ground-fault circuit-interrupter device.

BACKGROUND OF THE DISCLOSURE

Ground-fault circuit-interrupter (GFCI) devices are switches that open when current in an electric circuit is flowing along an unintended path. In general, a GFCI device detects when current flowing from the positive side of the power source (e.g., an AC voltage source, or the like) is different than the current returning to the negative side of the power source. GFCIs are often used in locations where electric current might find an alternative path to return to ground (e.g., near water, grounded metal structures, or the like). GFCI devices may be used to shut off a circuit to prevent unwanted shocks or electrocution due to the current traveling along an unintended path. Accordingly, the installation of GFCI devices in certain locations is often mandated by different safety standards. Additionally, these safety standards often specify what types of devices are suitable to be installed in such locations. For example, some standards exist that specify minimum requirements for the function, construction, performance, and markings of GFCI devices.

One such standard is the Underwriter's Laboratories (UL) 943C standard. UL 943C specifies that a GFCI device must satisfy the following performance requirements: (1) the GFCI must be able to detect line-side miswiring; (2) the GFCI must be able to withstand line transients of 6 kV and 3 kA as defined by International Electrotechnical Commission (IEC) 61000-4-5; (3) the GFCI must be able to pass a 2200 Volt AC dielectric test for 60 seconds; (4) the GFCI must have a ground-fault trip level of 20 mA; (5) the GFCI must have a trip time that is less than the inverse time curve defined for GFCI devices and must not exceed 20 ms for high ground-fault currents; (6) the GFCI must be able to withstand a 5 kA short-circuit fault; (7) the GFCI must be able to function from 85% to 110% voltage with a 100 A load applied over a temperature range of −35° C. to 40° C.; (8) the GFCI must be able to monitor load-side ground continuity; (9) the GFCI must include a ground-fault test function. It would therefore be desirable to provide a GFCI device that meets or exceeds the minimum requirements set forth in such standards.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In accordance with the present disclosure, a three-phase, three-wire, 600-V, 100-A rated ground-fault circuit interrupter (GFCI) device that meets the requirements of relevant standards is provided. An exemplary embodiment of the GFCI device includes a set of input terminals and a set of output terminals. Each of the input terminals is electrically connected to one of the load terminals through a contactor and a conductor line. A current transformer is operably coupled to the conductor lines. The current transformer is configured to output a secondary current corresponding to a primary current magnitude of electrical current flowing from the input terminals to the load terminals. A contactor control module is configured to cause the contactors to close during normal operation of the GFCI device and open based on receiving a fault signal. A current detection module is configured to determine whether the primary current magnitude exceeds a predetermined value and to send the fault signal to the contactor control module based on the determination that the primary current magnitude exceeds the predetermined value. A transient suppression module is electrically connected to the input terminals and comprises three wye-connected metal-oxide varistors having a way point connected to a capacitor, a miswire detection module configured to detect a misconnection between the input terminals and the load terminals and send the fault signal to the contactor control module based on detecting the misconnection. A ground-fault test module is configured to insert into the current transformer a predefined current magnitude to cause the current detection module to send the fault signal to the contactor control module. A ground load detection module is configured to detect whether a load connected to the load terminals is not grounded and send the fault signal to the contactor control module based on detecting that the load is not grounded. A fail-safe module is configured to detect a failure of the GFCI device and send the fault signal to the contactor control module based on detecting the failure.

With some examples, the GFCI device may include a housing having a plurality of ventilation apertures. In some examples, the GFCI device may be configured to operate with system voltages of 208 V, 240 V, 480 V, and/or 600 V.

DETAILED DESCRIPTION

The present disclosure will now be described more fully hereinafter with reference to the accompanying drawings, in which preferred embodiments of the disclosure are shown. This claimed subject matter, however, may be embodied in many different forms and should not be construed as being limited to the embodiments set forth herein. Rather, these embodiments are provided so that this disclosure will be thorough and complete, and will fully convey the scope of the claimed subject matter to those skilled in the art. In the drawings, like numbers refer to like elements throughout.

Figure 1:
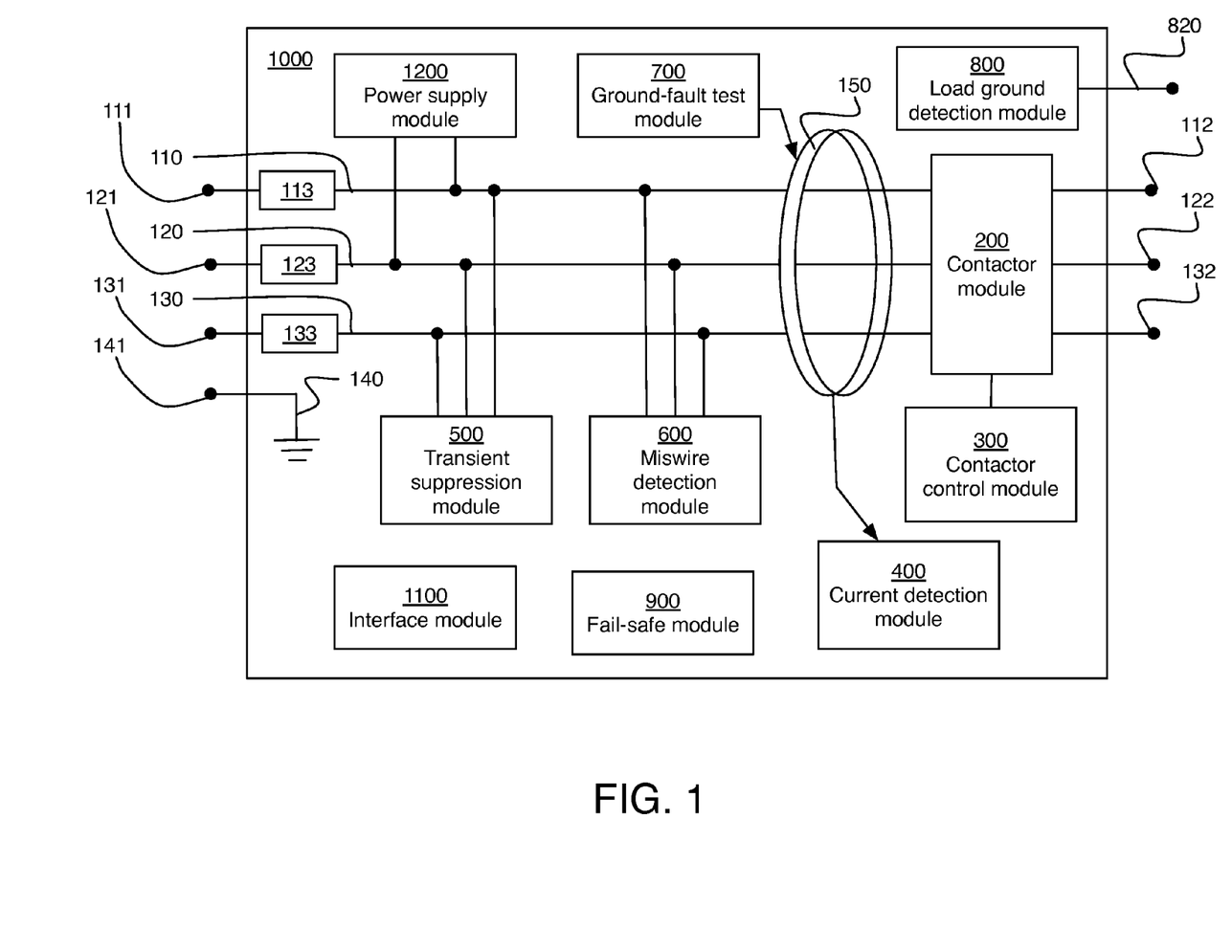
FIG. 1 is a block diagram illustrating an exemplary embodiment of a GFCI device in accordance with the present disclosure.

Referring to FIG. 1, a block diagram of an exemplary three-phase GFCI device 1000 in accordance with the present disclosure is illustrated. As will be appreciated, three-phase electric power is transmitted on three different conductors. In general, each conductor carries an alternating current of the same frequency, where the current on each conductor is delayed from the currents on the other conductors (e.g., by ⅓ and ⅔ of a cycle, respectively). In order to provide a connection to three-phase power, the GFCI device 1000 may include conductor lines 110, 120, and 130 respectively.

Each of the conductor lines may include an input terminal and a load terminal. For example, input terminals 111, 121, and 131 as well as load terminals 112, 122, and 132 are depicted. The input terminals are configured to connect the GFCI device 1000 to a three-phase power source. Additionally, the load terminals are configured to connect the GFCI device 1000 to a load (e.g. motor, or the like). Furthermore, the GFCI device 1000 may include a ground line 140 and a ground terminal 141 for connecting the GFCI device 1000 to ground. Furthermore, the GFCI device 1000 may include a current transformer (CT) 150 explained in greater detail below.

During operation, current may flow from the three-phase power supply to the load through conductor lines 110, 120, and 130. The GFCI device 1000 may be configured to interrupt this flow of current by opening contactors (described in greater detail below) in a contactor module 200. In general, the GFCI device 1000 may be configured to open the contactors in a variety of situations and conditions as described herein. More specifically, the GFCI device may "trip" or open the circuit in a variety of different conditions.

In order to provide the current interrupting features described herein, the GFCI device 1000 may include a number of sub-devices, circuits, or other components, referred to herein as "modules". For example, as depicted in FIG. 1, the GFCI device 1000 includes contactor module 200, a contactor control module 300, a current detection module 400, a transient suppression module 500, a miswire detection module 600, a ground-fault test module 700, a load ground detection module 800, a fail-safe module 900, an interface module 1100, and a power supply module 1200.

It is to be appreciated, that the modules depicted in FIG. 1 may be interconnected (e.g., electrically, physically, operably, or the like) in varying configurations. Not all the connections between modules are depicted in FIG. 1 for clarity of presentation. However, those of ordinary skill in the art will appreciate the various connections that may be necessary to implement the modules based on the entirety of this disclosure. It is particularly important to note, that although not depicted in FIG. 1, the power supply module 1200 may be electrically connected to a number of the other modules to provide a constant regulated power source (described in greater detail below) to the other modules in order to provide power for the operation of the module components.

Additionally, it is important to note that although not depicted in FIG. 1, the contactor control module may be electrically and/or operably connected to a number of the other modules to receive indications (e.g., signals, commands, or the like) from the other modules that the contactors in the contactor module 110 should be opened. More specifically, the contactor control module 300 may be configured to receive signals that cause the GFCI device 1000 to open or trip, thereby interrupting the current flow between the input terminals 111, 121, and 131 and the load terminals 112, 122, and 132.

Additionally, the GFCI device 1000 may include fuses 113, 123, and 133 operably connected to the conductor lines 110, 120, and 130, respectively. With some examples, the fuses may have a rating of 200 Amps.

FIGS. 2-11 illustrate exemplary embodiments of some of the modules of the GFCI device 1000 illustrated in FIG. 1. It is important to note, that some of the examples depicted in the GFCI device 1000, and the modules described with reference to FIGS. 2-11 may be configured in accordance with the UL 943C standard. However, it is to be appreciated that although reference is made to the UL 943C standard, embodiments are not limited in this context. For example, some embodiments may be provided in accordance with other GFCI standards.

Additionally, it is important to note, that a variety of the modules described herein may be implemented using a microprocessor, or other computing device configured to execute computer executable instructions or perform computing functions. With some examples, a single microprocessor may be implemented to perform the functionality of all the microprocessors described herein. With other examples, individual microprocessors may be implemented to perform the functionality of one or more of the microprocessors described herein. Examples are not limited in this context.

Figure 2:
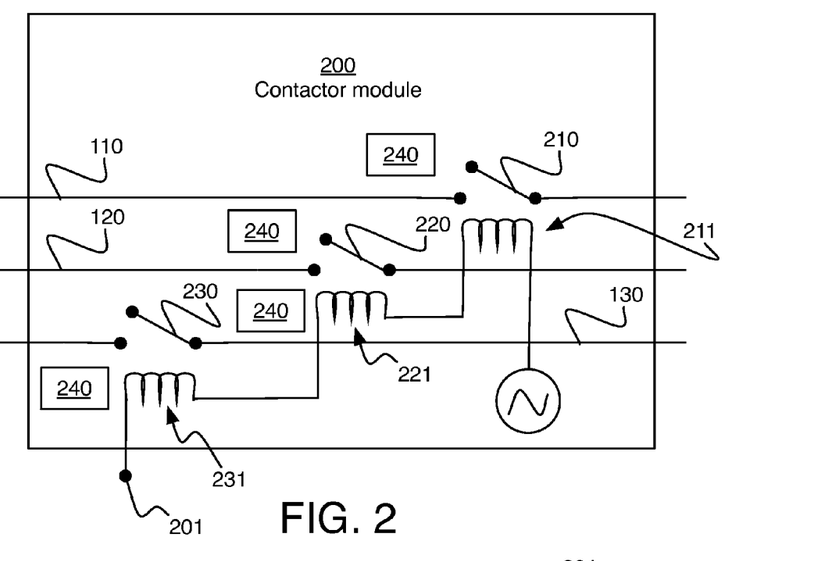
FIG. 2 is a schematic diagram illustrating a contactor module of the GFCI device shown in FIG. 1.

Turning more specifically to FIG. 2, a schematic diagram of an exemplary contactor module 200 is illustrated. As depicted, the contactor module 200 includes contactors 210, 220, and 230. Each of the contactors is connected to one of the conductor lines 110, 120, and 130. The contactors are configured to interrupt the current flow through the conductor lines. With some examples, the contactors may be electrically controlled switches. Those of ordinary skill in the art will appreciate that a variety of types of contactors may be implemented in the contactor module 110. Furthermore, the current rating and/or capacity of the contactors may vary (e.g., depending upon the implementation, the power source connected to input terminals, the load connected to load terminals, or the like).

With some examples, the contactors 210, 220, and 230 may include coils 211, 221, and 231 that when energized cause the contactors to open or close. In some examples, contactors may be normally open, as such, when the coils are energized, the contactors close, thereby allowing current to flow from the input terminals to the load terminals. In some examples, the coils may be connected in series (e.g., as depicted in FIG. 2). With some examples, the coils may be connected in parallel. The coils may be connected to a power source (e.g., input power through the conductor lines or the like). The contactor control module 300 may be configured to energize and de-energize the coils to open and close the contactors (described in greater detail below). A terminal 201 may be provided to electrically connect the contactor module 200 to the contactor control module 300. More specifically, a terminal 201 may be provided, which when connected to ground (e.g., described below) energizes the coils and closes the contactors.

With some examples, the contactor module 200 may include heat sinks 240 operably connected to the contactors 210, 220, and 230. The heat sinks 240 may be attached to the poles (not shown) of the contactors. For example, pole terminals that may normally be reserved for additional control-wire connections may be used to mount the heat sinks 240.

In some examples, each of the heat sinks 240 may have a surface area of 60 cm2 (9.5 in2). It is to be appreciated, however, that the size of the heat sinks 240 may vary depending upon the application requirements. It is to be appreciated, that although four heat sinks 240 are shown in FIG. 2, more or less heat sinks may be provided in various embodiments.

Figure 3:
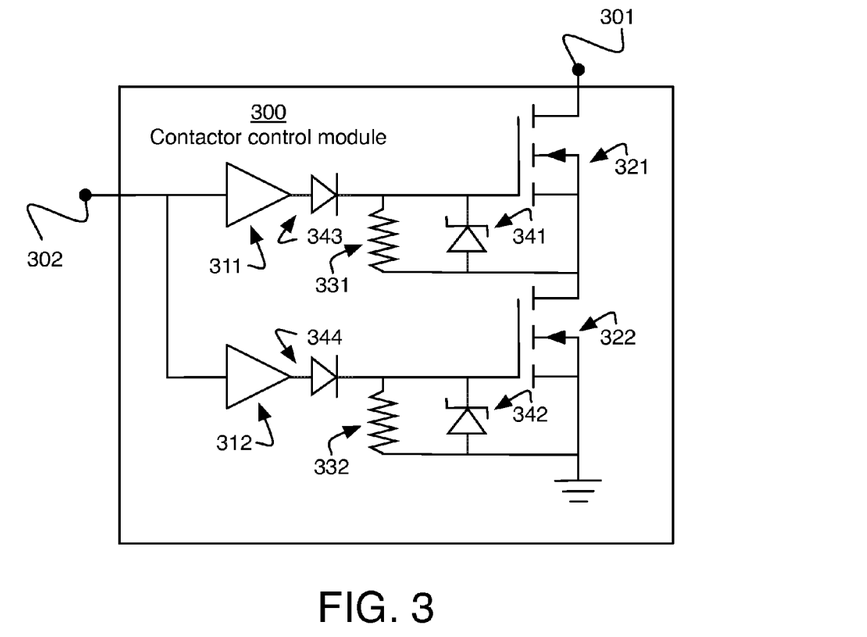
FIG. 3 is a schematic diagram illustrating a contactor control module of the GFCI device shown in FIG. 1.

Turning to FIG. 3, a schematic diagram of an exemplary contactor control module 300 is illustrated. The contractor control module 300 may be configured to energize and de-energize the coils in the contactor module 200 to open and close the contactors 210, 220, and 230. With some examples, the contactor control module 300 may include a low-voltage buffer and a high-voltage solid-state transistor switch configured to energize and/or de-energize the coils of the contactor module 200. The contactor control module 300 may include an output terminal 301. With some examples, the output terminal 301 may be electrically connected to the input terminal 201 of the contactor module 200.

In some examples, the contactor control module 300 may be configured such that if a transistor switch fails (e.g., shorts, or the like) the contactors will be opened. Additionally, the contactor control module 300 may be configured such that a failure of the transistor switch will not damage the low-voltage buffer, potentially causing the contactors to remain closed. In order to achieve this functionality, some examples may provide a series transistor drive circuit as illustrated in FIG. 3. As depicted, low voltage buffers 311 and 312 are electrically connected in parallel to a common input terminal 302. The input terminal 302 may be connected to a variety of modules of the GFCI device 1000 as will be described in greater detail below. Furthermore, the contactor control module 300 may include two transistor switches 321 and 322. In some examples, the transistor switches 321 and 322 may be metal-oxide semiconductor field-effect transistors (MOSFETs), bipolar junction transistors, etc. The low-voltage buffers 311 and 312 may be connected to the gate of the transistor switches 321 and 322, respectively. As depicted, the transistor switches 321 and 322 are connected in a series configuration where the source of the first transistor switch 321 is connected to the drain of the second transistor switch 322; the source of the second transistor switch 322 is connected to ground; and the drain of the first transistor switch 321 is connected to the output terminal 301.

The low-voltage buffers 311 and 322 may receive an input signal from the input terminal 302 and provide a sufficient voltage to the gates of the transistor switches to turn on the switches. When the transistor switches 321 and 322 turn on, a path from the output terminal 301 to ground will be provided. As such, if the output terminal 301 is connected to terminal 201, then the coils may be energized, thus closing the contactors 210, 220, and 230. In some examples, the low-voltage buffers 311 and 312 may be configured to provide a 12VDC signal when on and a 0 VDC signal when off.

Resistors 331 and 332 may be electrically connected as shown. More specifically, the resistor 331 may be electrically connected in parallel across the gate and the source of the first transistor switch 321 and the resistor 332 may be electrically connected in parallel across the gate and the source of the first transistor switch 322. During operation, when the low-voltage buffers switch from on to off, the resistors 331 and 332 may assist in turning the transistor switches off. In some examples, the resistors 331 and 332 may have a resistance value of 10 kΩ.

With some examples, diodes 341 and 342 may be electrically connected in parallel with the resistors 331 and 332, respectively. In some examples, the diodes 341 and 342 may be 15-volt transient suppressor diodes (e.g., zener diodes, or the like) configured to ensure the gate-to-source voltage of the transistor switches remains within specified limits during normal operation. Furthermore diodes 343 and 344 may be electrically connected in series between the low-voltage buffers 311 and 312 and the gate of the switches 321 and 322, respectively. With some examples, the diodes 343 and 344 are rated at the anticipated voltage of the contactor coils 211, 221, and 231. With some examples, this voltage may be approximately equal to the supply voltage plus the clamping voltage of the coil suppressor. In a particularly illustrative example, this voltage may be approximately equal to 250 V.

During operation, when the transistor switches 321 and 322 are off, the stored inductive energy in the contactor coils may cause the drain voltage of the first transistor switch 321 to increase. In the case of a short of the first transistor switch 321, the second transistor switch 322 performs the switching function and the coil voltage may appear at the source of the switch 321 and transfer to the gate of the switch 321 by flowing through the diode 341. The diode 343 blocks this potentially destructive voltage to prevent a failure on the output of the low-voltage buffer 311 and other circuit components.

It should be noted that the diode 344 may be provided to prevent similar damage to the low-voltage buffer 312 in the event of multiple failures (e.g., both switches 321 and 322, or the like). However, this is optional and is not specifically required. For example, the UL 943C standard does not require immunity to multiple failures. As such, the GFCI device 1000 provided without the diode 344 may still satisfy the UL 943C standard.

Figure 4:
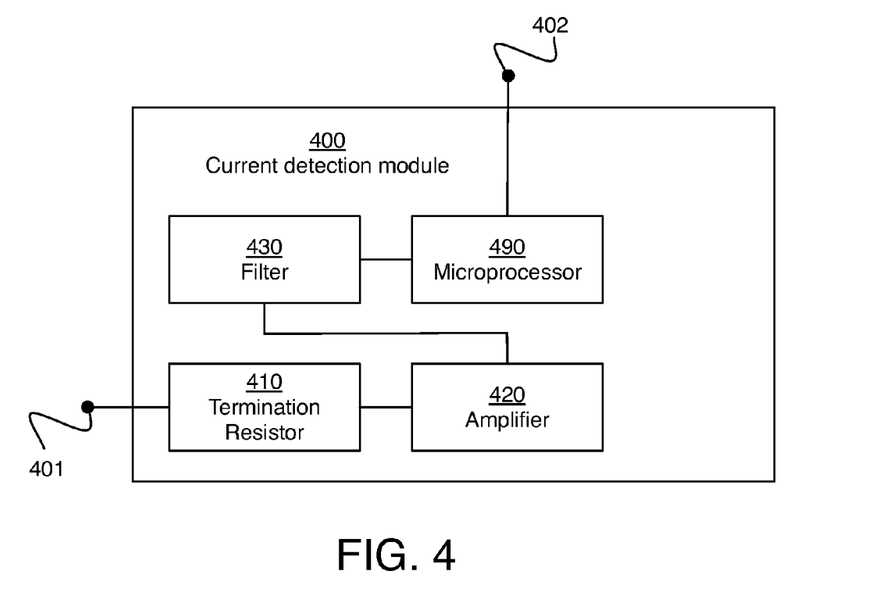
FIG. 4 is a block diagram of a current detection module of the GFCI device shown in FIG. 1.

Turning more specifically to FIG. 4, a block diagram of an exemplary current detection module 400 is illustrated which is configured to sense the current in the conductor lines 110, 120, and 130. More specifically, as will be appreciated, the current transformer (CT) 150 may provide a current proportional to the current in the conductor lines 110, 120, and 130. More specifically, the current transformer (CT) 150 may be configured to generate a secondary current, which is proportional to a primary current flowing through the conductor lines. It is to be appreciated that a variety of different types of current transformers may be implemented as the current transformer (CT) 150. With some examples, the current transformer (CT) 150 may be a 600:1 current transformer.

The current detection module 400 may include an input terminal 401 electrically connected to the output of the current transformer (CT) 150 and an output terminal 402 electrically connected to the input terminal 302 of the contactor control module 300. The current detection module 400 may also include a termination resistor 410, an amplifier 420, a filter 430, and a microprocessor 490, electrically connected in series as depicted in FIG. 4. More particularly, the termination resistor 410 may connected to input 401 and may convert the secondary current sensed by the current transformer (CT) 150 into a voltage signal. The voltage signal may be amplified by the amplifier 420 and then filtered by filter 430. In some examples, the filter 430 may be a 500 Hz low-pass filter. The signal may then be received by the microprocessor 490. In some examples, the filter may be connected to an analog to digital (A/D) input of the microprocessor 490.

The microprocessor 490 may be configured to execute a sampling algorithm that utilizes the received voltage signal to determine the magnitude of the primary current in the three-phase conductor lines 110, 120, and 130. The microprocessor 490 may implement an inverse-time algorithm to determine if the GFCI device 1000 should be tripped based on the determined magnitude of the primary current. For example, if the determined magnitude of the primary current in the conductor lines 110, 120, and 130 exceeds a predefined limit, the microprocessor 490 may output a voltage signal to cause the contactors to open. More specifically, the microprocessor 490 may output a voltage signal (e.g., 0 Volts, or the like) to the output terminal 402. The output terminal 402 may be electrically connected to the input terminal 302. As such, the 0 Volt output signal would be received by the buffers 311 and 321, and the transistor switches 321 and 322 would be turned off accordingly, thereby causing the contactors to open as described above.

Figure 5:
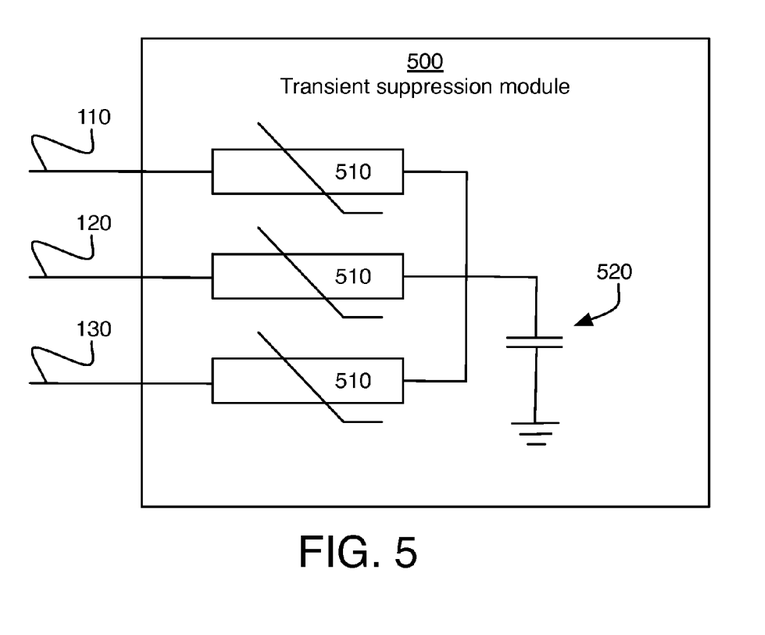
FIG. 5 is a schematic diagram of a transient suppression module of the GFCI device shown in FIG. 1.

FIG. 5 is a schematic diagram of an exemplary transient suppression module 500. As will be appreciated, the UL 943C standard specifies that GFCI devices must withstand 1.2/50 μs, 8/20 μs voltage/current transient pulses of 6 kV and 3 kA.

As will be appreciated, metal-oxide varistors (MOVs) may be employed in transient suppressors. Typically, the MOVs may be connected from line-to-line or line-to-ground. However, line-to-line connected MOVs are not effective against line-to-ground transients, and line-to-ground connected MOVs or gas tubes, which are effective in suppressing line-to-ground transients, do not meet dielectric test requirements because there is a low-resistance path to ground for voltage above the MOV or gas tube threshold voltage. As a result, dielectric testing indicates an erroneous insulation failure, which is undesirable.

The transient suppression module 500 may be provided to overcome the above noted deficiencies. More particularly, to meet the requirements of the UL 943C standard, the GFCI device 1000 may be provided with the three-phase MOV transient suppression module 500. As depicted, the module 500 of the GFCI device 1000 includes three wye-connected MOVs 510 with the wye point connected to a capacitor 520. More specifically, each of the MOVs 510 are connected to one of the conductor lines and then wye connected to the capacitor 520. With some embodiments, the capacitor 520 may be a 4.7 of Y1 type capacitor UL/CSA rated for 240 VAC. Capacitor 520 provides a low-impedance path to ground for transient pulses and a high impedance path (>200 kΩ) for line-frequency current.

In some examples, voltage rating of the MOVs 510 may be selected so that it is above 110% of the line-to-line voltage minus the steady-state rating of the capacitor 520. For example, the voltage rating of the MOVs 510 may be (1.1× 600)−240=420 V. With these selection criteria, the wye point of the MOV connection may be operating near zero volts under un-faulted conditions and may not exceed 240 V under ground-fault conditions.

An example GFCI device 1000 implemented with the above MOVs 510 and capacitor 520 was tested as follows: the power supply was removed from the GFCI device 1000, the conductor lines 110, 120, and 130 were connected together and a voltage of 2200 VAC was applied between the inputs and ground for 60 seconds. The dielectric rating of the capacitors 520 was typically 4 kV. Accordingly, it was verified that a transient voltage suppressor as described sustained the required dielectric test voltage, which meets the UL 943C requirements.

Figure 6:
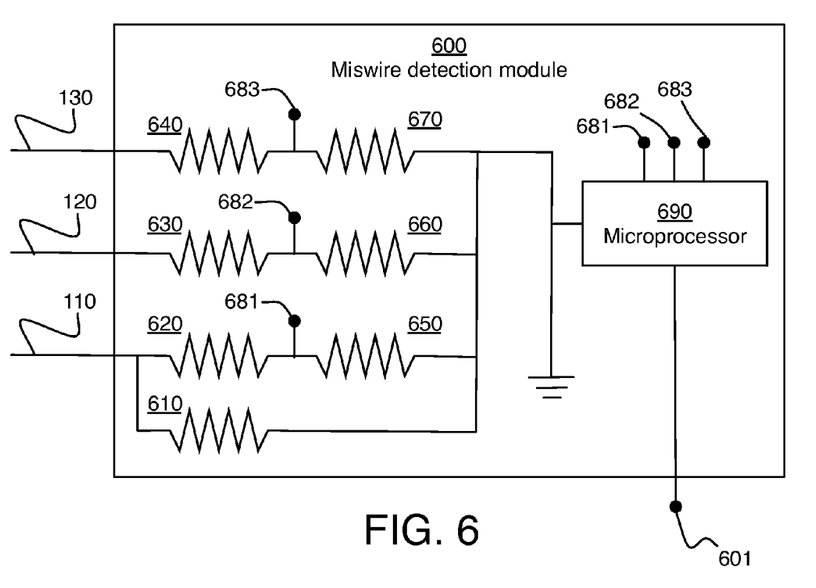
FIG. 6 is a schematic diagram of a miswire detection module of the GFCI device shown in FIG. 1.

Turning more specifically to FIG. 6, a schematic diagram of an exemplary miswire detection module 600 is illustrated. The miswire detection module 600 may be configured to detect loss of input ground or general miswiring of the input phases of the conductor lines 110, 120, and 130 of the GFCI device 1000. As depicted, the module 600 may be composed of an unbalanced resistor network. More specifically, each of the conductor lines are connected to a resistor network and ground, with one of the conductor lines (e.g., the conduction line 110) unbalanced from the other two. For example, conduction line 110 is connected to ground through serially connected resistors 620 and 650. In addition, the conduction line 110 is connected to ground through resistor 610, which is connected in parallel across the resistors 620 and 650. Conduction line 120 is connected to ground through serially connected resistors 630 and 660 and conduction line 130 is connected to ground through serially connected resistors 640 and 670.

Additionally, each of the serially connected resistor pairs includes a voltage-divider output. More specifically, a first output 681, a second output 682, and a third output 683 are provided. Each of the voltage-divider outputs may be connected to input of microprocessor 690. For example, the voltage-divider outputs 681, 682, and 683 may be connected to an A/D input of the microprocessor 690.

The microprocessor 690 may be configured to detect when the voltages 681, 682, and 683 are unbalanced relative to ground and prevent the contactors from closing in the event that the voltages are unbalanced. More specifically, the microprocessor 690 may be configured to determine when the voltages 681, 682, and 683 are unbalanced and cause the GFCI device 1000 to trip. The microprocessor 490 may output a voltage signal to terminal 601, which may be connected to the contactor control module 300.

As will be appreciated, during operation, the measurement of 681, 682, and 683 are made with reference to ground. If the external supply ground is not connected, the internal GFCI device 1000 ground will float to the unbalanced neutral point (e.g., 681) defined by the resistor network. Under this condition, the three voltages 681, 682, and 683 will not be balanced, indicating a loss of input ground. In such an example, the contactors may be prevented from being closed (e.g., the coils will not be energized). Conversely, if the external ground is properly connected, the input line-to-ground voltages will be equal. As a result, the voltages 681, 682, and 683 will be balanced and the contactors may be allowed to close (e.g., the coils may be allowed to be energized).

With some examples, the resistors 620, 630, and 640 may be rated at 4.7 MΩ, the resistors 650, 660, and 670 may be rated at 4.7 kg2, and the resistor 610 may be rated at 2.35 MΩ. It is to be appreciated, that the above-described voltage imbalance can alternatively be achieved by connecting the resistor 610 in parallel across either the resistors 630 and 660 or the resistors 640 and 670 instead of across the resistors 620 and 650 as depicted.

Figure 7:
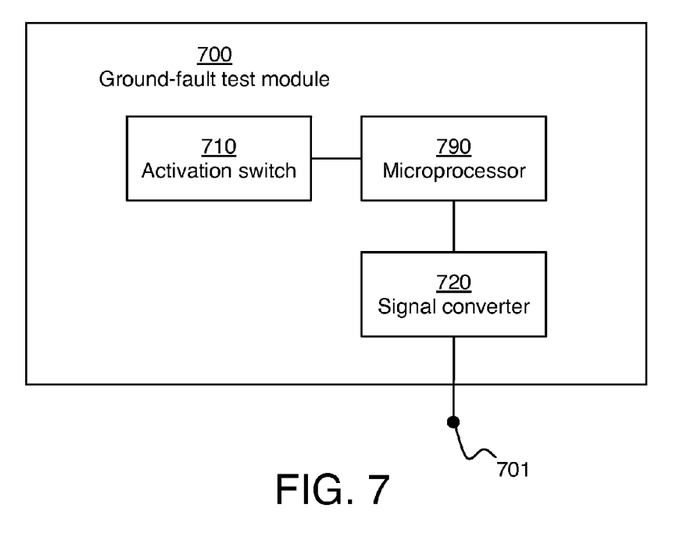
FIG. 7 is a block diagram of a ground-fault test module of the GFCI device shown in FIG. 1.

Turning more specifically to FIG. 7, a block diagram of an exemplary ground-fault test module 700 is illustrated. As will be appreciated, the UL 943C standard requires GFCI devices to include ground-fault test features. As such, in order to comply with the UL 943C standard, the GFCI device 1000 may include the module 700. The module 700 includes an activation switch 710, a microprocessor 790, and converter 720. In general, the switch 720 may be any device that may be actuated by a user to initiate a ground-fault test by the GFCI device 1000. With some examples, the switch 710 may be implemented in the interface module 1100 (described in greater detail below).

During operation, when the switch 710 is actuated, the microprocessor 790 generates a predefined pulse-width modulated (PWM) voltage signal. With some examples, the microprocessor 790 may implement a PWM sine-wave algorithm to generate the PWM voltage signal that is greater than the trip threshold specified in the UL 943C standard. The voltage signal is converted into a current signal by the signal converter and passed through the window of the current transformer (CT) 150. More specifically, the current signal output by the signal converter 720 is sent to the current transformer (CT) 150, which is electrically connected to the terminal 701. As the magnitude of the current is above the trip threshold of the GFCI device 1000, a ground-fault will be detected (e.g., by the current detection module 400) and the contactors will be opened. As such, the GFCI device includes functionality to determine if it is operating properly.

Figure 8:
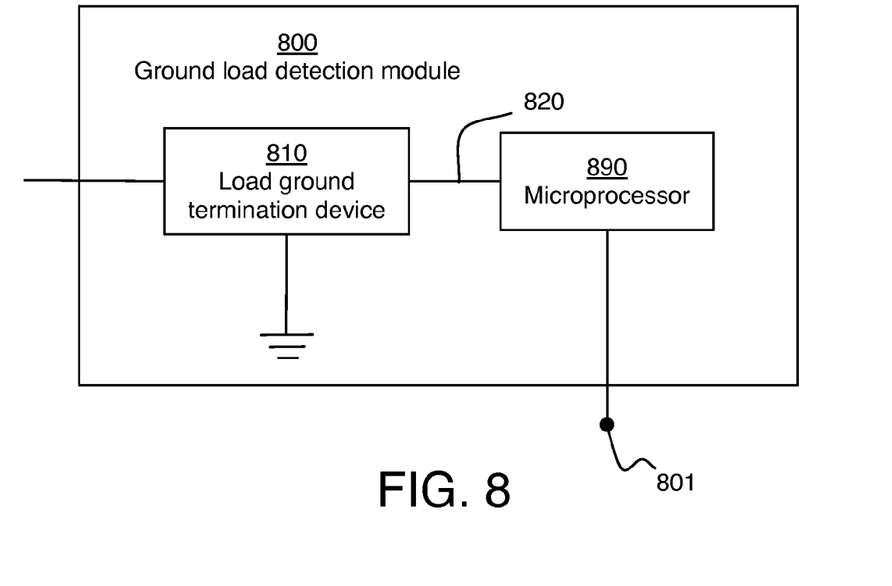
FIG. 8 is a block diagram of a ground load detection module of the GFCI device shown in FIG. 1.

Turning more specifically to FIG. 8, a block diagram of an exemplary load ground detection module 800 is illustrated. As will be appreciated, the UL 943C standard specifies that GFCI devices should provide for the detection of a load ground connection. As such, the GFCI device 1000 may include the load ground detection module 800. The module 800 includes a ground termination device 810 located at the load and a microprocessor 890. In general, the module 800, using a DC continuity circuit may be configured to verify that the termination device is connected to ground at the load. More specifically, the load may be grounded through the ground connection between the GFCI device 1000 and the load (e.g., via the terminal 141, or the like). Additionally, the ground load termination device 810 may be connected to ground and the microprocessor 890 via a sense wire 820. In some examples, the device 810 may be a diode. With particularly illustrative examples, the device 810 may be a 5.6 Volt zener diode.

The microprocessor 890 may implement a checking algorithm to check the continuity of the series combination of the sense wire 820, the termination device 810, and the ground connection. If continuity is not confirmed, it may be determined that the load is not properly grounded and the GFCI device 1000 may trip. More particularly, the microprocessor 890 may supply a voltage signal to terminal 801, which terminal may be electrically connected to the contactor control module 400. As such, the GFCI device 1000 may be tripped as described above. Examples of load ground detection are described in greater detail in U.S. Pat. No. 6,304,089, which is herein incorporated by reference in its entirety.

Figure 9:
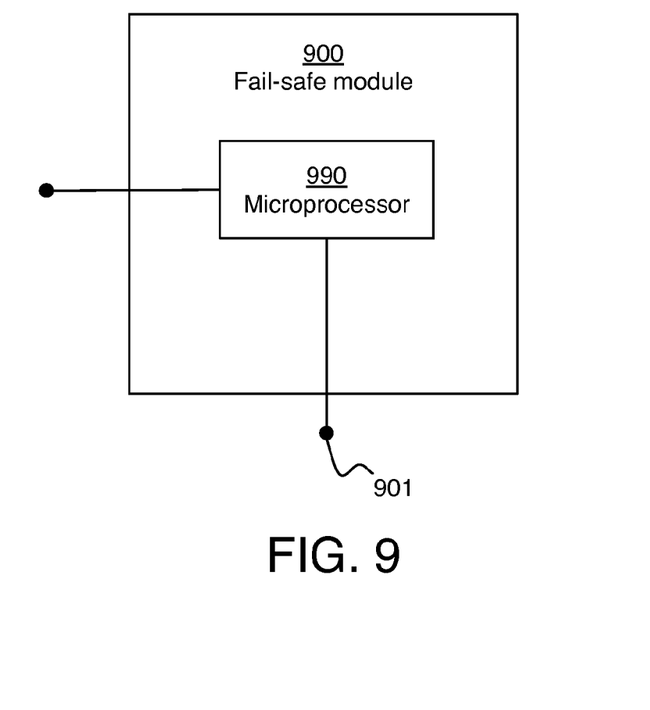
FIG. 9 is a block diagram of a fail-safe module of the GFCI device shown in FIG. 1.

Turning more specifically to FIG. 9, a block diagram of an exemplary fail-safe module 900 is illustrated that includes a microprocessor 990 and an output terminal 901. In general, the module 900 may provide that in the event of a failure of one of the microprocessors in the GFCI device 1000, the GFCI device will fail in the open position. More specifically, in the event of a failure in one of the microprocessors 490, 690, 790 and/or 890, the module 900 may cause the GFCI device 1000 to trip. With some examples, the microprocessor 990 may implement what is commonly referred to as a "watchdog circuit." It is important to note, that the fail-safe module 900 may implement this watchdog circuit using an additional microprocessor, different from the microprocessor(s) implemented in the other modules.

If the microprocessor 990 detects an error in the other microprocessors, the microprocessor 990 may output a voltage signal to terminal 901, which terminal may be electrically connected to the contactor control module 400. As such, the GFCI device 1000 may be tripped as described above.

Figure 10:
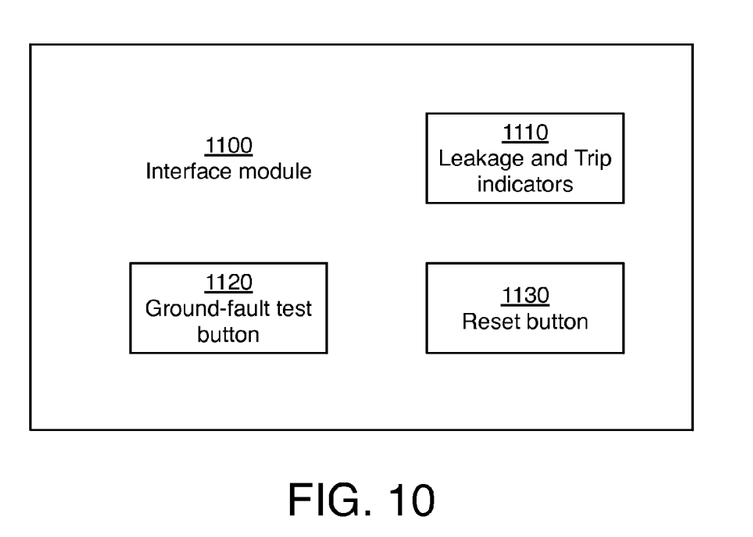
FIG. 10 is a block diagram of an interface module of the GFCI device shown in FIG. 1.

Turning more specifically to FIG. 10, a block diagram of an exemplary interface module 1100 is illustrated. The interface module 1100 of the GFCI device 1000 may include leakage and trip indicators 1110. In some examples, the leakage and trip indicators 1110 may be light emitting diodes (LEDs) or similar indicating means, located on the exterior of a housing of the GFCI device 1000. The indicators 1110 may provide observers (e.g., a user or operator) with an indication of the GFCI device's operational state. The interface module 1100 may further include a ground-fault test button 1120 and a reset button 1130 also located on the exterior of the housing. In some examples, the button 1120 may be operatively connected to the activation switch 710 in order to initiate a ground-fault test as described above. As such, by depressing the test button 1120, a human operator may manually actuate the switch 710 and initiate a ground-fault trip test in the manner described above. Additionally, the depressing of the reset button 1130 may restore the GFCI device 1000 to normal operation after a ground-fault trip test has been performed.

Figure 11:
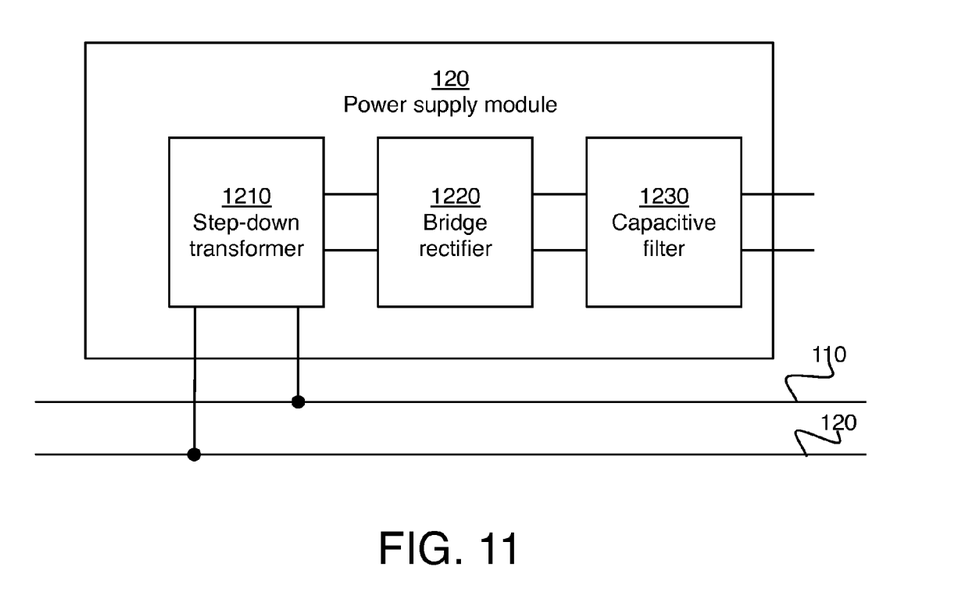
FIG. 11 is a block diagram of a power supply module of the GFCI device shown in FIG. 1.

Turning more specifically to FIG. 11, a block diagram of an exemplary power supply module 1200 is illustrated. In general, the power supply module 1200 provides power to the other modules of the GFCI 1000. As depicted, the power supply module 1200 includes a step-down transformer 1210, a bridge rectifier 1220, and a capacitive filter 1230. The step-down transformer 1210 is electrically connected to the conductor lines 110 and 120. As such, during operation, the step-down transformer 1210 may receive some of the power supplied by the three-phase power supply connected to the input terminals 111 and 121. The step-down transformer 1210 may then step-down the voltage to a level desired to power the components of the GFCI device 1000. The bridge rectifier 1220 is electrically connected to the step-down transformer 1210. The bridge rectifier 1220 converts the ac power signal from the step-down transformer 1210 into a direct current power signal. The capacitive filter 1230 is electrically connected to the bridge rectifier 1220. The capacitive filter 1230 regulates the power signal prior to being supplied to the other components of the GFCI device 1000.

As such, the power supply module 1200 may provide a constant, regulated power signal to the components of the GFCI device 1000. In particular, the power supply module 1200 provides constant regulated voltage to the contactor control module 400. This is significant because stored inductive energy in the coils of the contactors (refer to FIG. 2) increase with coil voltage. An increase in the inductive energy can cause the release time of the contactors to increase, thus increasing the time it takes for the GFCI device 1000 to trip and interrupt the current flow between the input terminals and the load terminals. However, the power supply module 1200 provides a constant regulated power source so that the time to open the contactors is not affected by the voltage supplied on the input terminals 111, 121, and 131.

Figure 12:
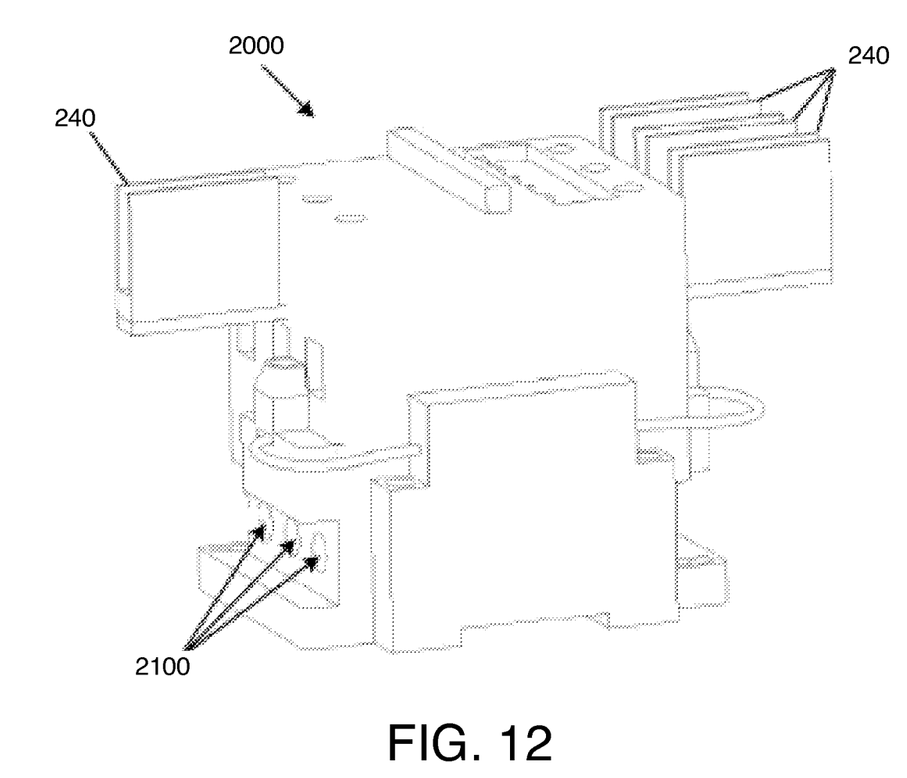
FIG. 12 is a perspective view illustrating a contactor module enclosure used in the GFCI device shown in FIG. 1 with contactor heat sinks mounted on the contactor poles.

FIG. 12 illustrates an exemplary enclosure 2000 for the contactor module depicted in FIG. 2. It is important to note that the heat sinks 240 are illustrated as mounted externally to the contactor enclosure 2000. In general, the enclosure 2000 may not allow ambient air to circulate within the enclosure. Heat generated by the contactors may therefore cause the internal temperature of the enclosure 2000 to rise excessively when the GFCI device 1000 operates at the rated current of 100 A. As will be appreciated, this heat may be transferred to the contactor coils and increase the resistance of the coils. As a result, the pull-in voltage of the contactors may increase and may prevent the contactors from energizing when ambient temperatures reach 40° C.

As such, in order to cool the coils, ventilation apertures 2100 may be provided. As depicted, the ventilation apertures 2100 are disposed near the base of the enclosure 2000. Examples, however, are not limited in this context. More specifically, the apertures 2100 may be disposed in other areas of the enclosure 2000 to improve cooling and exhaust of heat generated inside the enclosure 2000.

During testing, the combination of the heat sinks 240 and the ventilation apertures 2100 was found to provide a 15° C. reduction in the temperature of the contactor poles, thereby allowing the GFCI device 1000 to function properly under full-load at 40° C. ambient temperature conditions.

With some examples, the enclosure 2000 contactor may be installed in another chassis (not shown) containing the other components of the device 1000. As such, the device 1000 may be provided including the contactor module 200 installed in the enclosure 2000. With further examples, the device 1000 including the contactor module 200 installed in the enclosure 2000 may be further installed in a NEMA 4X sealed enclosure having a surface area of, for example, 0.57 m$^2$.

While the present disclosure has been described with reference to certain embodiments, numerous modifications, alterations and changes to the described embodiments are possible without departing from the sphere and scope of the present invention, as defined in the appended claim(s). Accordingly, it is intended that the present invention not be limited to the described embodiments, but that it has the full scope defined by the language of the following claims, and equivalents thereof.

The invention claimed is:

1. A three-phase ground-fault circuit-interrupter (GFCI) device comprising:
   a set of input terminals and a set of output terminals, each of the input terminals electrically connected to one of the load terminals through a contactor and a conductor line;
   a current transformer operably coupled to the conductor lines, the current transformer to output a secondary current, the secondary current corresponding to a primary current magnitude of electrical current flowing from the input terminals to the load terminals;
   a contactor control module configured to cause the contactors to close during normal operation of the GFCI device and open based on receiving a fault signal;
   a current detection module configured to determine whether the primary current magnitude exceeds a predetermined value and to send the fault signal to the contactor control module based on the determination that the primary current magnitude exceeds the predetermined value;
   a transient suppression module electrically connected to the input terminals, the transient suppression module comprising three wye-connected metal-oxide varistors having a wye point connected to a capacitor;
   a miswire detection module configured to detect a misconnection between the input terminals and the load terminals and send the fault signal to the contactor control module based on detecting the misconnection;
   a ground-fault test module configured to insert into the current transformer a predefined current magnitude to cause the current detection module to send the fault signal to the contactor control module;
   a ground load detection module configured to detect whether a load connected to the load terminals is not grounded and send the fault signal to the contactor control module based on detecting that the load is not grounded; and
   a fail-safe module configured to detect a failure of the GFCI device and send the fault signal to the contactor control module based on detecting the failure,
   wherein each of the contactors include a coil to open or close the contactor, the contactor control module comprising a first transistor switch and a second transistor switch, the first and second transistor switches electrically connected in series between the coils of the contactors and ground, wherein the first transistor switch and the second transistor switch are selected from the group consisting of metal oxide field effect transistors and bipolar junction transistors, wherein the source of the first transistor switch is directly connected to the drain of the second transistor switch, the source of the second transistor switch is directly connected to ground, and the drain of the first transistor switch is connected to the coils of the contactors,
   the contactor control module further comprising:
   a first low-voltage buffer and a second low-voltage buffer, the input of the first and second low-voltage buffers electrically connected to a fault signal input, the output of first low-voltage buffer electrically connected to the gate of the first transistor switch and the output of the second low-voltage buffer electrically connected to the gate of the second transistor switch;
   a first resistor and a first diode electrically connected in parallel across the gate and the source of the first transistor switch and a second resistor and a second diode electrically connected in parallel across the gate and the source of the second transistor switch; and
   a third diode electrically connected in series between the output of the first low-voltage buffer and the gate of the first transistor switch and a fourth diode electrically connected in series between the output of the second low-voltage buffer and the gate of the second transistor switch.

2. The three-phase GFCI device of claim 1, further comprising at least one heat sink operably connected to each of the contactors.

3. The three-phase GFCI device of claim 1, the current detection module comprising:
   a resistor electrically connected to the current transformer such that the secondary current flow through the resistor; and
   a microprocessor, the microprocessor configured to:
   measure a voltage across the resistor;
   determine the primary current magnitude based on the measured voltage;
   determine whether the primary current magnitude exceeds a predetermined value; and
   output the fault signal based on the determination that the primary current magnitude exceeds the predetermined value.

4. The three-phase GFCI device of claim 1, the miswire detection module comprising:
   an unbalanced resistor network electrically connected to the input terminals, the unbalanced resistor network including voltage outputs, each of the voltage outputs corresponding to one of the input terminals; and
   a microprocessor configured to determine whether one of the voltage outputs is unequal to the others and output the fault signal when it is determined that the one of the voltage outputs in unequal to the others.

5. The three-phase GFCI device of claim 1, the ground fault test module comprising:
   an activation switch;
   a microprocessor configured to generate a voltage signal when the activation switch is activated; and
   a signal converter configured to convert the voltage signal to a current signal and insert the current signal into the current transformer.

6. The three-phase GFCI device of claim 5, further comprising a test button operably connected to the activation switch.

7. The three-phase GFCI device of claim 1, the ground load detection module comprising:
- a termination device located at the load, the termination device electrically connected between a sense wire and a load ground; and
- a microprocessor operably coupled to the termination device, the microprocessor configured to:
  - measure a continuity of the termination device;
  - detect whether the load is not connected to ground based at least in part on the measured continuity; and
  - send the fault signal to the contactor control module based on detecting that the load is not connected to ground.

8. The three-phase GFCI device of claim 1, further comprising a power supply control module operably connected to the contactor control module, the power supply control module comprising:
- a step-down transformer electrically connected to two of the input terminals;
- a bridge rectifier electrically connected to the step-down transformer; and
- a capacitive filter electrically connected to the bridge rectifier.

9. A three-phase GFCI device comprising:
- a set of input terminals and a set of output terminals, each of the input terminals electrically connected to one of the load terminals through a contactor and a conductor line;
- a current transformer operably coupled to the conductor lines, the current transformer to output a secondary current, the secondary current corresponding to a primary current magnitude of electrical current flowing from the input terminals to the load terminals;
- a contactor control module configured to cause the contactors to close during normal operation of the GFCI device and open based on receiving a fault signal;
- a current detection module configured to determine whether the primary current magnitude exceeds a predetermined value and to send the fault signal to the contactor control module based on the determination that the primary current magnitude exceeds the predetermined value;
- a transient suppression module electrically connected to the input terminals, the transient suppression module comprising three wye-connected metal-oxide varistors having a wye point connected to a capacitor;
- a miswire detection module configured to detect a misconnection between the input terminals and the load terminals and send the fault signal to the contactor control module based on detecting the misconnection;
- a ground-fault test module configured to insert into the current transformer a predefined current magnitude to cause the current detection module to send the fault signal to the contactor control module;
- a load ground detection module configured to detect whether a load is not grounded and send the fault signal to the contactor control module based on detecting that the load is not grounded;
- a fail-safe module configured to detect a failure of the GFCI device and send the fault signal to the contactor control module based on detecting the failure; and
- a housing,
- wherein each of the contactors include a coil to open or close the contactor, the contactor control module comprising:
  - a first transistor switch and a second transistor switch, the first and second transistor switches electrically connected in series between the coils of the contactors and ground, wherein the first transistor switch and the second transistor switch are selected from the group consisting of metal oxide field effect transistors and bipolar junction transistors, wherein the source of the first transistor switch is directly connected to the drain of the second transistor switch, the source of the second transistor switch is directly connected to ground, and the drain of the first transistor switch is connected to the coils of the contactors;
  - a first low-voltage buffer and a second low-voltage buffer, the input of the first and second low-voltage buffers electrically connected to a fault signal input, the output of first low-voltage buffer electrically connected to the gate of the first transistor switch and the output of the second low-voltage buffer electrically connected to the gate of the second transistor switch;
  - a first resistor and a first diode electrically connected in parallel across the gate and the source of the first transistor switch and a second resistor and a second diode electrically connected in parallel across the gate and the source of the second transistor switch; and
  - a third diode electrically connected in series between the output of the first low-voltage buffer and the gate of the first transistor switch and a fourth diode electrically connected in series between the output of the second low-voltage buffer and the gate of the second transistor switch.

10. The three-phase GFCI device of claim 9, further comprising a plurality of heat sinks, wherein each of the plurality of heat sinks are operably connected to one of the contactors and mounted on the housing.

11. The three-phase GFCI device of claim 10, the current detection module comprising:
- a resistor electrically connected to the current transformer such that the secondary current flow through the resistor; and
- a microprocessor, the microprocessor configured to:
  - measure a voltage across the resistor;
  - determine the primary current magnitude based on the measured voltage;
  - determine whether the primary current magnitude exceeds a predetermined value; and
  - output the fault signal based on the determination that the primary current magnitude exceeds the predetermined value.

12. The three-phase GFCI device of claim 11, the miswire detection module comprising:
- an unbalanced resistor network electrically connected to the input terminals, the unbalanced resistor network including voltage outputs, each of the voltage outputs corresponding to one of the input terminals, the microprocessor configured to determine whether one of the voltage outputs is unequal to the others and output the fault signal when it is determined that the one of the voltage outputs in unequal to the others.

13. The three-phase GFCI device of claim 12, the ground fault test module comprising:
- an activation switch, the microprocessor configured to generate a voltage signal when the activation switch is activated; and
- a signal converter configured to convert the voltage signal to a current signal and insert the current signal into the current transformer.

14. The three-phase GFCI device of claim 13, further comprising a test button mounted on the housing, the test button operably connected to the activation switch.

15. The three-phase GFCI device of claim 14, the load ground detection module comprising:
- a termination device located at the load, electrically connected between a sense wire and a load ground,
- the microprocessor operably coupled to the termination device, the microprocessor configured to:
  - measure a continuity of the termination device;
  - detect whether a load connected is not connected to ground based at least in part on the measured continuity; and
  - send the fault signal to the contactor control module based on detecting that the load is not connected to ground.

16. The three-phase GFCI device of claim 15, further comprising a power supply control module operably connected to the contactor control module, the power supply control module comprising:
- a step-down transformer electrically connected to two of the input terminals;
- a bridge rectifier electrically connected to the step-down transformer; and
- a capacitive filter electrically connected to the bridge rectifier.

17. The three-phase GFCI device of claim 16, wherein the microprocessor is a first microprocessor, the fail-safe module comprising a second microprocessor, the second microprocessor configured to detect a failure of the fist microprocessor and send the fault signal to the contactor control module based on detecting the failure.

18. The three-phase GFCI device of claim 17, wherein the housing includes a plurality of ventilation apertures.

* * * * *